Figure 1:
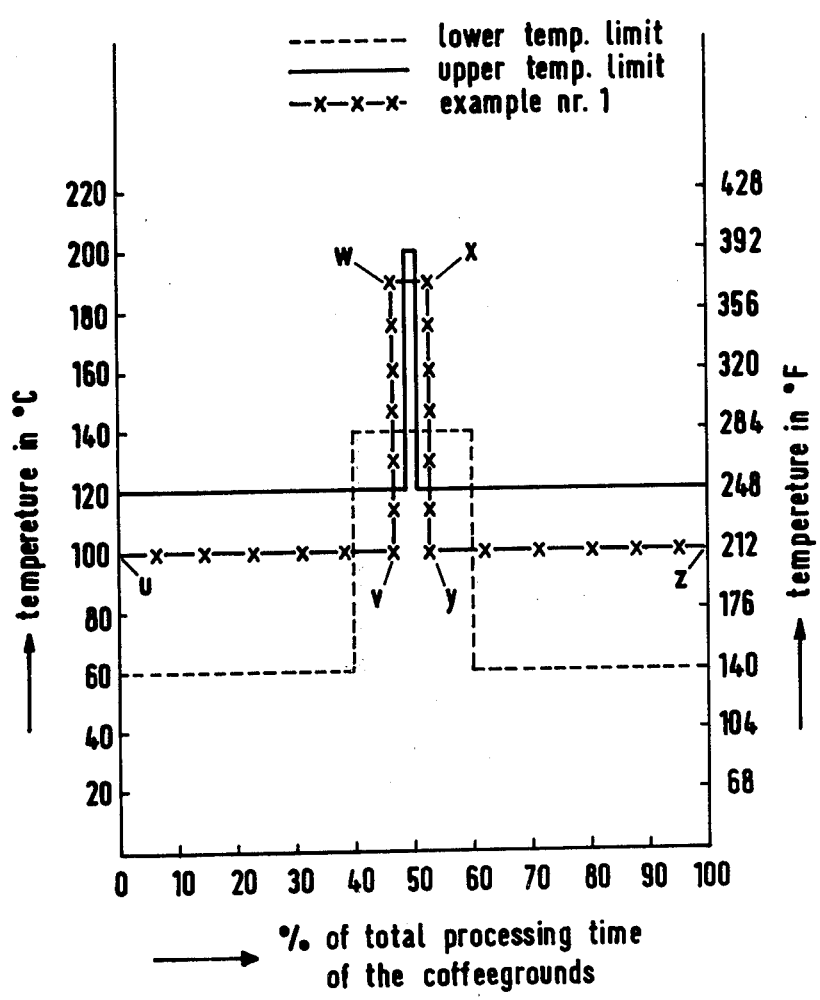

United States Patent [19]

Wouda

[11] 4,158,067

[45] Jun. 12, 1979

[54] COFFEE EXTRACTION

[75] Inventor: Hermanus A. J. Wouda, Utrecht, Netherlands

[73] Assignee: D.E.J. International Research Company B.V., Utrecht, Netherlands

[21] Appl. No.: 829,946

[22] Filed: Sep. 1, 1977

[30] Foreign Application Priority Data

Sep. 18, 1976 [GB] United Kingdom ............... 38797/76

[51] Int. Cl.$^2$ ................................................ A23F 1/08
[52] U.S. Cl. ..................................... 426/432; 426/434
[58] Field of Search ............................... 426/432, 434

[56] References Cited

U.S. PATENT DOCUMENTS

| 2,333,027 | 10/1943 | Morgenthaler | 426/432 X |
| 2,380,046 | 7/1945 | Huguenin | 426/434 |
| 2,573,406 | 10/1951 | Clough et al. | 426/432 X |
| 2,915,399 | 12/1959 | Guggenheim et al. | 426/434 |
| 2,915,403 | 12/1959 | Clinton et al. | 426/434 |
| 3,361,571 | 1/1968 | Nutting et al. | 426/534 X |
| 3,361,572 | 1/1968 | Nutting et al. | 426/534 |

*Primary Examiner*—Joseph M. Golian
*Attorney, Agent, or Firm*—Cushman, Darby & Cushman

[57] ABSTRACT

Process and apparatus for the preparation of extracts from ground roasted coffee and the like comprising subjecting ground roasted coffee sequentially to (a) exhaustive extraction of the solubles at a temperature at which no substantial hydrolysis of coffee solids occurs, (b) heating for a short time to a temperature at which insoluble coffee solids are transformed into extractable substances, and (c) exhaustive leaching at a temperature within the same range as that used for step (a).

7 Claims, 3 Drawing Figures

COFFEE EXTRACTION

The invention is concerned with the preparation of extracts from ground roasted coffee and the like. These extracts may e.g. be used for the manufacture of instants powders.

According to one aspect of the invention a process for the preparation of extracts from ground roasted coffee and the like comprises subjecting the ground roasted coffee sequentially to the following treatment steps:

(a) exhaustive extraction of the solubles at a temperature at which no substantial hydrolysis of coffee solids occurs, this extraction comprising leaching with an aqueous solvent, said leaching resulting in removing at least substantially all the non-volatile soluble solids;

(b) heating for a short time to a temperature at which coffee solids, insoluble at the temperature mentioned under (a) are transformed into substances extractable in step (c), said heating being accomplished substantially in the absence of substances extracted in step (c);

(c) exhaustive leaching with water at a temperature within the same range as that used for step (a).

The leaching in steps (a) and (c) will be preferably accomplished countercurrently. By 'countercurrent leaching' we mean extraction in any system of apparatuses in which material is fed in continuously or intermittently at one end and extracted material is withdrawn continuously or intermittently at the other end, while solvent is being led through the material in opposite direction. Countercurrent leaching methods and apparatuses for coffee and the like are described e.g. in Perry 'Chemical Engineers Handbook', 5th. ed. (1973) section 19 pgs. 41–43 and Sivetz "Coffee Processing Technology" (1963) Vol. 1 pgs. 261-320.

The exhausted extraction of the solubles as mentioned above in step (a) may be accomplished exclusively by the leaching with an aqueous solvent. It may however also be accomplished by a combination of leaching with an aqueous solvent resulting in removing at least substantially all the non-volatile soluble solids and stream stripping to remove the volatile solubles. These volatile soluble will comprise volatile aroma components. The steam stripping may be accomplished either before or after the leaching with an aqueous solvent in step (a) and will be described in more detail below. The aqueous solvent used in step (a) may be either water or the solution obtained in step c.

When speaking of 'water' we include those cases in which, according to methods known in the art small amounts of other substances have been added, e.g. with the purpose of adjusting the pH.

The temperature used in steps (a) and (c) are in the range of 60°–120° C., 90° C. to 100° C. being preferred, while the temperature used in step (b) is in the range of 140°–200° C., preferably 160° to 190° C.

The preferred duration of the treatment in step (b) is in the range of 2–30 min., more specifically 5–10 min. The higher the temperature the shorter this time can be. Very good results have e.g. been obtained with a time of about 5 minutes at a temperature of 190° C. Conveniently but not necessarily the temperatures chosen for steps (a) and (c) are kept approximately constant during either extraction step. Conveniently also, but again not necessarily, the temperature chosen for step (c) is approximately equal to the temperature chosen for step (a).

The present invention will now be further described with reference to the accompanying drawings.

In FIG. 1 the preferred temperature profiles for the lower and the upper limits are shown, as well as the temperature profile belonging to example 1 described below. Step (a) is represented by the line u-v, step (b) by w-x, step (c) by y-z. It should be observed, however, that the lines in the FIG. 1 are not meant to suggest that a relatively low temperature in steps (a) and (c) should always be associated with a relatively low temperature in step (b).

Figure 2:
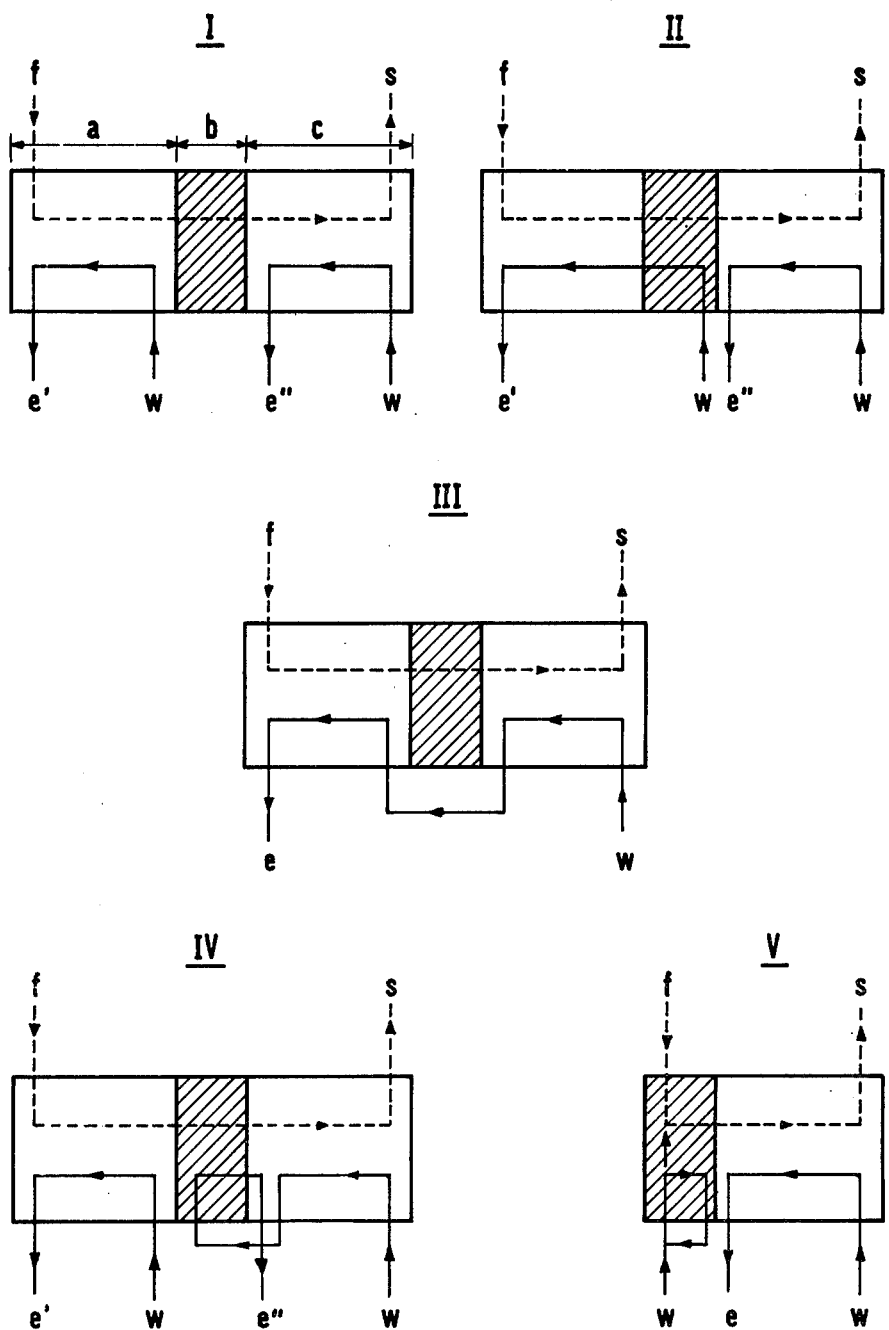

In FIG. 2, being a schematical representation of the extraction processes at issue, three possible embodiments of the process according to the invention are shown and numbered I, II and III respectively, where a=first low temperature section; b=high temperature section; c=second low temperature section; f=freshly ground coffee; s=spent coffee; w=water; e=extract.

It has to be borne in mind and it has been found according to the invention that at the temperatures of step (b) material in the coffee is solubilized, but that on prolonged subjection of the coffee to these temperatures certain reactions occur that tend to form sediment, causing a decrease in yield.

For each temperature there is thus an optimum time of treatment for the highest yield and the optimum can be determined for each particular type of ground roasted coffee by simple trials. In addition to the reactions tending to the formation of sediment, other reactions that are detrimental to the quality of the final product occur on prolonged heating at high temperatures. That is why, once the substances made soluble in the high temperature zone (b) have been extracted in the low temperature zone (c), they must not be returned to the high temperature zone. This is the advantage gained by the process according to the invention, compared with the processes according to the Swiss Pat. No. 516.284 (=German application No. 2.056.082; Haco) and the German application No. 1.492.742 (Industrie Werke Karlsruhe), which are schematically represented in FIG. 2, as cases IV and V respectively.

Before the ground coffee is exposed to the high temperature of step (b), substantially all substances which may give rise to undesirable reactions at this temperature have to be removed. If the water to coffee ratio in step (a) has been such that this has not been the case, the remaining substances in question may be stripped from the solid material obtained in this step with steam, according to another aspect of the invention. The aroma containing steam condensate may be added back in the course of further processing. Stripping of ground coffee with steam is known per se and is e.g. described in Pintauro "Soluble Coffee Manufacturing Processes" (1969), Chapter 4.

Alternatively other—known—methods may be used to minimize the risk of undesirable reactions occuring in step (b). One such method is to strip the ground coffee with steam before extraction step (a), and to add the aroma containing steam condensate to the extract obtained according to the invention in the course of further processing, e.g. for manufacturing instant coffee.

When stripping is applied, as just described, the water to coffee ratio during the first extraction may be comparatively low, although it may not fall below a certain level for technical reasons.

Another method involves using a rather high water to coffee ratio, stripping the extract with steam, subsequently concentrating the extract by evaporation, and adding the aroma containing steam condensate in the course of further processing. (Swiss Pat. No. 353.609).

Yet another method, using a high water to coffee ratio without the need of stripping, is freeze concentration. It is especially useful when the concentrated extract will be further subjected to freeze-drying (compare U.S. Pat. No. 3.404.007).

The extract obtained in step (c) may be concentrated by any conventional method, such as evaporation under reduced pressure (see e.g. Perry, cited above, section 11, pgs. 27–32).

A preferred embodiment of the invention is schematically shown in case 1 of FIG. 2. In this embodiment the grounds, extracted in step (a) are drained, so as to remove or substantially reduce the amount of "free water" present between the coffee particles. The desired temperature in step (b) is then obtained by treating the material with saturated steam at the appropriate pressure. Steam condensing on the material will rapidly heat it to the desired temperature. Other methods of heating e.g. with hot gas, with micro-waves etc., however, are not excluded.

In the case that steam is used, release of the pressure will cause water (which has previously condensed in the warming up phase) to evaporate, and the temperature of the material will drop rapidly. As the case may be release of the pressure can be accomplished in a cyclone, such as e.g. described in Perry, cited above, section 20 pgs. 75–120.

Furthermore it should be observed that according to the invention the less 'free water' there is in the 'wet' product treated in step (b), the better, as this water tends to dilute the extract obtained in step (c).

Another embodiment of the invention is schematically shown in case II of FIG. 2. In this embodiment the grounds are not drained before step (b) and the desired temperature in step (b) is obtained by heating the aqueous solvent, used for the extraction step (a) and subsequently cooling the solvent before it is used as extraction solvent in step (a). The extract, obtained in step (c), does not pass the high temperature section.

Yet another embodiment of the invention is schematically shown in case III of FIG. 2. This case is essentially the same as case I except that the extract, obtained in step (c), is used as extraction solvent in step (a).

This means that a small part of the material, dissolved in the extract from step (c), will be absorbed by the coffee particles in step (a) and will be recirculated to the high temperature section (b).

It has been found however, that, as long as the dissolved material remains within the particles, the degradation of the extract is much less than one would expect.

When separate extracts are obtained in steps (a) and (c), (as in cases I and II in FIG. 2) they will usually be combined, as the case may be after they have undergone any one of the treatments (stripping, concentration) described above and have been further processed in any desired manner (e.g. to instant powder).

In the preferred embodiment of the invention just mentioned, we can conveniently use for the countercurrent leaching a screw conveyor in a tilted through, such as described in U.S. Pat. No. 2.713.009. Other embodiments such as the use of a battery of extraction vessels (Sivetz, cited above) centrifuges (Perry, cited above) and pressure filters (Perry, cited above) are not excluded, however.

According to another aspect of the invention there is provided a process for the extraction of a mixture of ground roasted coffee and ground roasted chicory. The preparation of a mixed instant powder of coffee and chicory has always been accomplished by preparing the extracts or the instant powders separately and subsequently mixing them.

The extraction of chicory, however, is a relatively slow process. This is due to slime formation causing high resistance to liquid flow in the packed bed of chicory particles to be extracted. When ground roasted chicory is mixed with ground roasted coffee however, the resistance to flow in the mixed bed is considerably lower. If, however, a mixed bed is treated in the way which is conventional for coffee, the chicory would be exposed to temperatures well above 100° C. in the second part of the extraction process and this would be detrimental to the quality of the extract obtained. Now according to the invention the ground roasted chicory is mixed with the coffee between process steps (b) and (c). This is possible using the methods illustrated in cases I and III in FIG. 2.

According to another aspect of the invention a system of apparatus is provided for the preparation of extracts from ground roasted coffee and the like, essentially comprising the following parts, operationally connected in the order of (a) to (c).

(a) means adapted to extract ground roasted coffee;
(b) means adapted to subject wet ground coffee to temperatures between 140° and 200° C.;
(c) means essentially as under (a).

In a preferred embodiment the system of apparatus will essentially comprise the following parts, operationally connected in the order of (i) to (v).

(i) a continuous extractor of the screw conveyor type;
(ii) means to convey wet ground coffee from part (i) to part (iii);
(iii) a pressure vessel adapted to withstand steam pressures of 2 to 16 atm; ($2 \times 10^5$ to $16 \times 10^5$ N/m²)
(iv) means to convey wet ground coffe from part (iii) to part (v);
(v) a second continuous extractor of the screw conveyor type.

Figure 3:
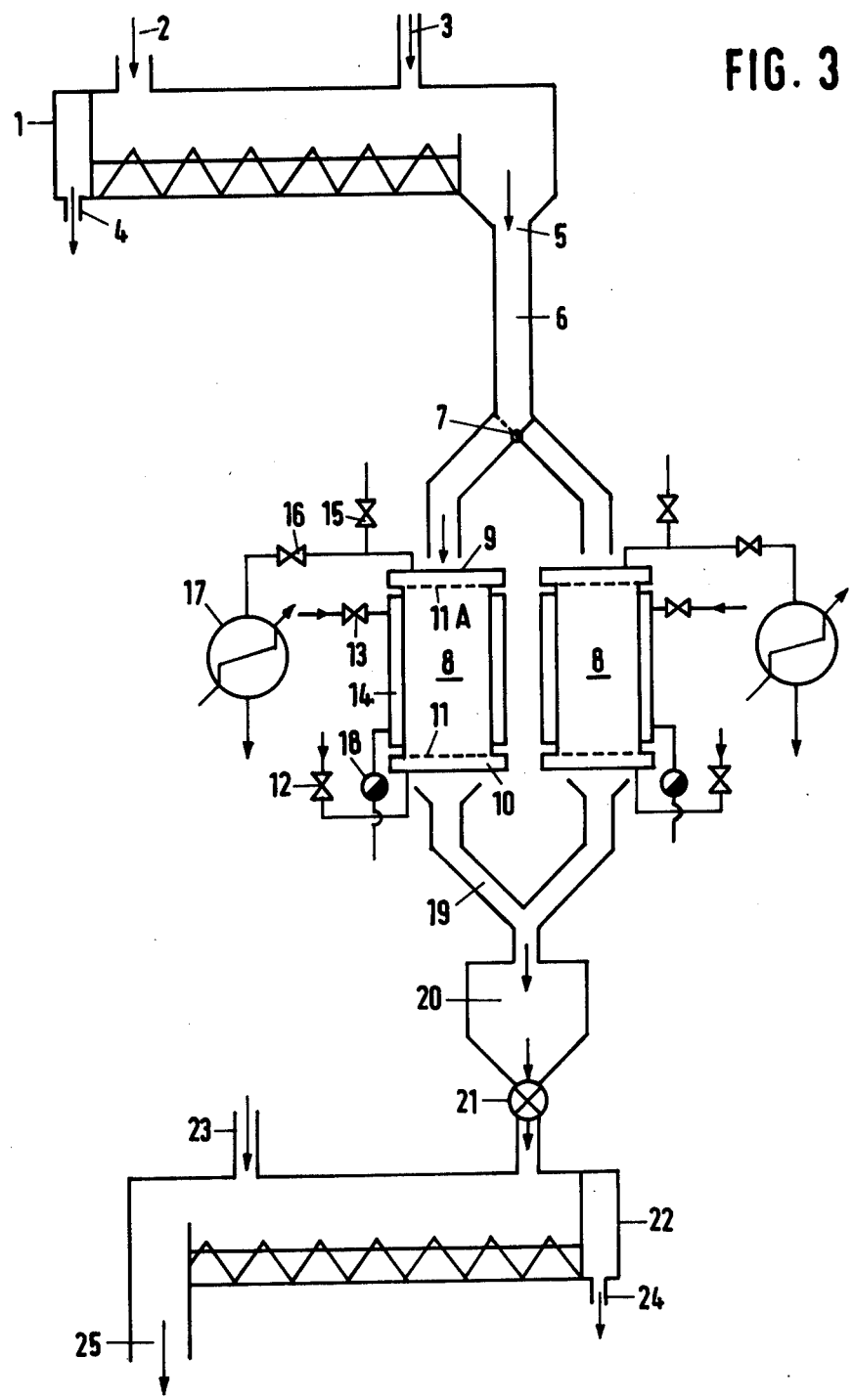

By way of example an apparatus which was successfully used by the inventor is schematically shown in FIG. 3. The type of extractor used is a so-called "NIRO" extractor, described in U.S. Pat. No. 2.713.009.

Freshly roasted and ground coffee is fed into the first extractor (1) and (2) and is discharged at (5). Solvent is introduced at (3). The coffee is extracted in counter current. The extract of the first stage, called primary extract, is discharged at (4). The primarily extracted coffee falls through discharge (6) and is led into either of the pressure vessels (8) with the aid of valve (7). The pressure vessels (8) have removable covers at the top (9) and at the bottom (10). The covers are double-walled, the inside plates (11) and (11a) being perforated to allow the passage of steam. Pressure vessels (8) further have double-walled jackets (14). Steam pressure can be applied to these jackets through valve (13) to heat the vessels or to maintain them at a given temperature. The condensate formed is discharged through steam trap (18).

Solubilization takes place by feeding steam of the desired temperature and the desired pressure into the sealed vessel through valve (12). When the coffee in the vessel has been treated for the time desired, the supply of steam is stopped by closing valve (12) and the pressure in the vessel is released by opening valve (15). The bottom cover is then removed and the hydrolyzed coffee passes through chute (19) into hopper (20). The coffee is fed from hopper (20) through rotary vane feeder (21) into the second extractor (22), which is identical with the first (1). Water is introduced at (23) and the extract obtained in the second stage, called secondary extract, is discharged from the extractor at (24). The spent grounds are discarded from the extractor at (25).

When aroma is stripped from the primarily extracted ground coffee before it is hydrolyzed, steam of a temperatuere of about 100° C. is fed into the sealed vessel with ground coffee through valve (12). The steam that is fed in from below passes through the perforated plate (11) of the cover and flows up through the coffee bed. The steam is equally distributed over the cross section of the vessel. The steam containing the coffee aroma constituents leaves the vessel at the top through perforated plate (11A) and passes through open valve (16) into heat exchanger (17) in which it is condensed.

The present invention will now be further illustrated by way of the following examples:

EXAMPLE 1

In a pilot-scale Niro extractor, as described in U.S. Pat. No. 2.713.009, 10 kg/h freshly roasted and ground coffee with an average particle size of 1.0 mm was extracted continuously and in countercurrent with 50 kgh water at a temperature of 98° C. 41.2 kg/h primary extract with a solids content of about 6% and 18.8 kg/h primarily extracted coffee with a moisture content of about 60% were obtained. The residence time of the ground coffee in the extractor was about 40 minutes, that of the coffee extract about 15 minutes. The yield obtained in the first extraction stage was about 25%, related to the weight of the dry raw material. The primary extract was freeze-concentrated without any significant loss of aroma to a solids content of about 25%, 10 kg/h concentrated extract being obtained.

The primarily extracted coffee was fed into one of two pressure vessels used, which had a capacity of about 2 kg product. The full vessel was closed. A steam pressure of about $1.27 \times 10^6$ N/m² was applied to the full vessel and the primarily extracted coffee was maintained at the corresponding temperature of 190° C. for 5 minutes. After five minutes the steam supply was stopped and, after release of the pressure, the bottom cover of the vessel was removed and the treated coffee was led into a hopper. The temperature of the coffee had then decreased to about 100° C. The two vessels were filled and emptied alternately and hydrolysis could be carried out continuously.

The primarily extracted and hydrolysed coffee was fed into a second pilot-scale screw conveyor that was identical with the first at a rate of 18.8 kg/h and was extracted in countercurrent with 16.9 kg/h water. The second extraction again took place at a temperature of 98° C. 19.2 kg/h secondary extract with a solids content of about 12% was obtained. The yield obtained in the second extraction stage was 23%, related to the weight of the dry raw material. The residence time of the coffee particles was about 40 minutes, that of the extract about 45 minutes. The secondary extract was concentrated to a solids content of 60% by evaporation under reduced pressure. 3.8 kg/h concentrated secondary extract was obtained. The concentrated secondary extract was mixed up with the concentrated primary extract, giving 13.8 kg/h extract with a solids content of about 35%. The total yield obtained was about 48%, related to the weight of the dry raw material. The combined extract was frozen, ground and freeze-dried.

The dry endproduct was judged by expert tasters and compared with a fresh brew prepared from the same raw material by filtering and with some instant coffees that had been made by conventional methods. The evaluations showed that the quality of the product obtained by the process of the invention approximated closely to that of the fresh brew and was far superior to that of the instant coffees made by conventional methods.

EXAMPLE 2

In a pilot-scale screw conveyor 6.5 kg/h freshly roasted and ground coffee with an average particle size of 1.0 mm was extracted continuously and in countercurrent with 11.8 kg/h water at a temperature of 98° C. 6.0 kg/h primary extract with a solids content of about 27% and 12.3 kg/h primarily extracted coffee with a moisture content of about 60% were obtained. Both the coffee and the extract had a residence time of about 60 minutes. The yield obtained in the first extraction stage was about 25%, related to the weight of the dry raw material. The primarily extracted coffee was fed into one of two pressure vessels used, which had a capacity of about 2 kg product. The full vessel was closed. Steam of a temperature of about 100° C. was passed through the primarily extracted coffee in the vessel. The steam was fed in at the bottom of the vessel and discharged at the top through a pipe that had been provided with a valve and connected to a cooler. The steam was condensed in the cooler. The condensed steam that contained aroma constituents extracted from the coffee was collected. Steam was passed through the coffee bed for 10 minutes at a speed sufficient to collect 140 ml aroma solution. The valve in the pipe connecting pressure vessel and cooler was then closed and a steam pressure of $1.27 \times 10^6$ N/m² was applied to the pressure vessel and its contents, raising the temperature to 190° C.

The coffee was kept at this temperature for 5 minutes. Subsequently the bottom cover of the vessel was removed, after release of the pressure, and the treated coffee was discharged into a hopper. The temperature of the coffee had then decreased to about 100° C. The two pressure vessels were filled and emptied alternately and aroma stripping and hydrolysis could be carried out virtually continuously. About 0.5 kg/h aroma solution was thus obtained on average. The aroma solution was added to the primary extract obtained previously giving about 6.5 kg/h aroma-enriched primary extract with a solids content of 25%. The primarily extracted and hydrolysed coffee, which retained about 60% moisture, was fed into a second pilot-scale screw conveyor that was identical with the first, at a rate of 12.3 kg/h and extracted continuously and in countercurrent with 11.0 kg/h water at a temperature of 98° C. 12.5 kg/h secondary extract with a solids content of about 12% was obtained in the second extraction stage. The yield was 23%, related to the weight of the dry raw material. Both the ground coffee and the extract had a residence time of about 60 minutes. The secondary extract was concentrated to a solids content of 60% by evaporation under reduced pressure. 2.5 kg/h concentrated secondary extract was obtained.

The concentrated secondary extract was mixed up with the aroma-enriched primary extract, giving 9.0 kg/h combined extract with a solids content of about 35%. The total yield was about 48%, related to the weight of the dry raw material.

The extract was frozen, ground and freeze-dried.

The dry product was judged by expert tasters and compared with the product obtained by the process of example 1 and with some instant coffees made by conventional methods. The evaluations showed that the quality of the product made by the process described in this example was slightly inferior to that of the product made by the process of example 1 but was superior to the quality of the products made by conventional methods.

EXAMPLE 3

6.5 kg/h freshly roasted and ground coffee was extracted with 11.8 kg/h water by the method described in example 2 and under identical conditions. Coffee aroma constituents were again stripped from the primarily extracted coffee with steam of about 100° C., giving about 0.5 kg/h aroma solution.

After aroma stripping the coffee was hydrolyzed under the conditions given in example 2. The aroma solution was added to the primary extract, giving 6.5 kg/h extract with a solids content of about 25%. The 12.3 kg/h primarily extracted and hydrolyzed coffee containing about 60% moisture was subsequently mixed with 5.0 kg/h ground, roasted chicory. The average particle size of the roasted chicory was 2 mm. The mixture was extracted continuously and in countercurrent with 14.6 kg/h water at a temperature of 98° C. in a pilot scale screw conveyor that was identical with that used for the first extraction stage.

15.1 kg/h secondary extract with a solids content of about 35% was obtained. The secondary extract contained both solids extracted from the coffee and solids extracted from the chicory. For the coffee the yield obtained in this extraction stage was about 23%, related to the weight of the dry coffee, and for the chicory the extraction yield was about 76%, related to the weight of the dry chicory. The residence time of the particles was about 40 minutes, that of the extract about 50 minutes.

The secondary extract was concentrated to a solids content of 60% by evaporation under reduced pressure. 8.8 kg/h concentrated extract was obtained. The concentrated secondary extract was mixed up with the aroma-enriched primary extract, giving 15.3 kg/h extract with a solids content of 45%.

The extract was spray-dried and about 5.3 kg/h dry product was obtained. The dry product was composed for 45%. I.e. 3.1 kg/h, of components extracted from the coffee and for 55%, i.e. 3.8 kg/h of components extracted from the chicory. The total yields obtained were about 48%, related to the weight of the dry coffee, and about 76%, related to the weight of the dry chicory. The dried mix product was judged by expert tasters and compared with several instant products that were also composed for 55% of chicory components and for 45% of coffee components and had been made by conventional methods. The evaluations showed that the product made by the process described in this example was qualitatively superior to the products made by conventional methods.

I claim:

1. Process for the preparation of extracts from ground roasted coffee comprising subjecting the ground roasted coffee sequentially to the following treatment steps:
    (a) exhaustive extraction of the solubles at a temperature in the range of 60°–120° C. at which no substantial hydrolysis of coffee solids occurs, this extraction comprising countercurrent leaching with an aqueous solvent, said leaching resulting in removing at least substantially all the non-volatile soluble solids and draining the grounds to at least substantially reduce the free water present between coffee particles;
    (b) heating the coffee grounds after said extraction for two to thirty minutes to a temperature in the range of 140°–200° C., at which coffee solids, insoluble at the temperature mentioned under (a), are transformed into substances extractable in step (c), said heating being accomplished substantially in the absence of extracted substances extracted in step (c);
    (c) exhaustive countercurrent leaching of the heated grounds with water at a temperature within the same temperature range as that used for step (a).

2. Process according to claim 1 whereby step (a) comprises steam stripping of the ground roasted coffee before the leaching with an aqueous solvent.

3. Process according to claim 1 whereby step (a) comprises steam stripping of the wet solid material after leaching with an aqueous solvent, followed by separating the solids from the extract.

4. Process according to claim 1 whereby the aqueous solvent used in step (a) is water.

5. Process according to claim 1, whereby the aqueous solvent used in step (a) is the solution obtained in step (c).

6. Process according to claim 1 whereby the temperatures in the steps (a) and (c) are in the range of about 90°–100° C., while the temperature in step (b) is in the range of about 160°–190° C. and the duration of the treatment in step (b) is 5–10 minutes.

7. Process according to claim 1 whereby ground roasted chicory is mixed with the ground roasted coffee between the steps (b) and (c).

* * * * *